United States Patent

Dalziel et al.

[15] 3,678,481

[45] July 18, 1972

[54] DATA STORAGE APPARATUS EMPLOYING A SINGLE MAGNETIC DISK

[72] Inventors: Warren L. Dalziel; Jay B. Nilson; Donald L. Wartner, all of San Jose, Calif.

[73] Assignee: International Business Machines Corporation, Armonk, N.Y.

[22] Filed: March 13, 1970

[21] Appl. No.: 19,197

[52] U.S. Cl. ..................................340/174.1 C, 179/100.2 Z

[51] Int. Cl. ....................G11b 25/04, G11b 5/54, G11b 5/82

[58] Field of Search ..........................179/100.2 CA, 100.2 Z; 274/9 B; 340/174.1 C

[56] References Cited

UNITED STATES PATENTS

| | | | |
|---|---|---|---|
| 3,529,301 | 9/1970 | Hiruta | 340/174.1 C |
| 2,508,845 | 5/1950 | Thompson | 274/9 B |
| 2,905,475 | 9/1959 | Cheeseboro | 274/9 B |
| 3,593,327 | 7/1971 | Shill | 179/100.2 Z |

*Primary Examiner*—J. Russell Goudeau
*Attorney*—Hanifin & Jancin and Nathan N. Kallman

[57] ABSTRACT

A magnetic disk storage file employs an interchangeable sealed disk cartridge that drops into a guide channel, with the file cover open. When the cover is closed, the disk cartridge is positioned by a centering device, and at the same time is clamped to a rotary drive. Upon energization of a solenoid actuator, the flexible disk is loaded against a magnetic head assembly. The head assembly is mounted to a carriage, enabling direct accessing of the disk radially through an elliptical aperture in the cartridge.

6 Claims, 11 Drawing Figures

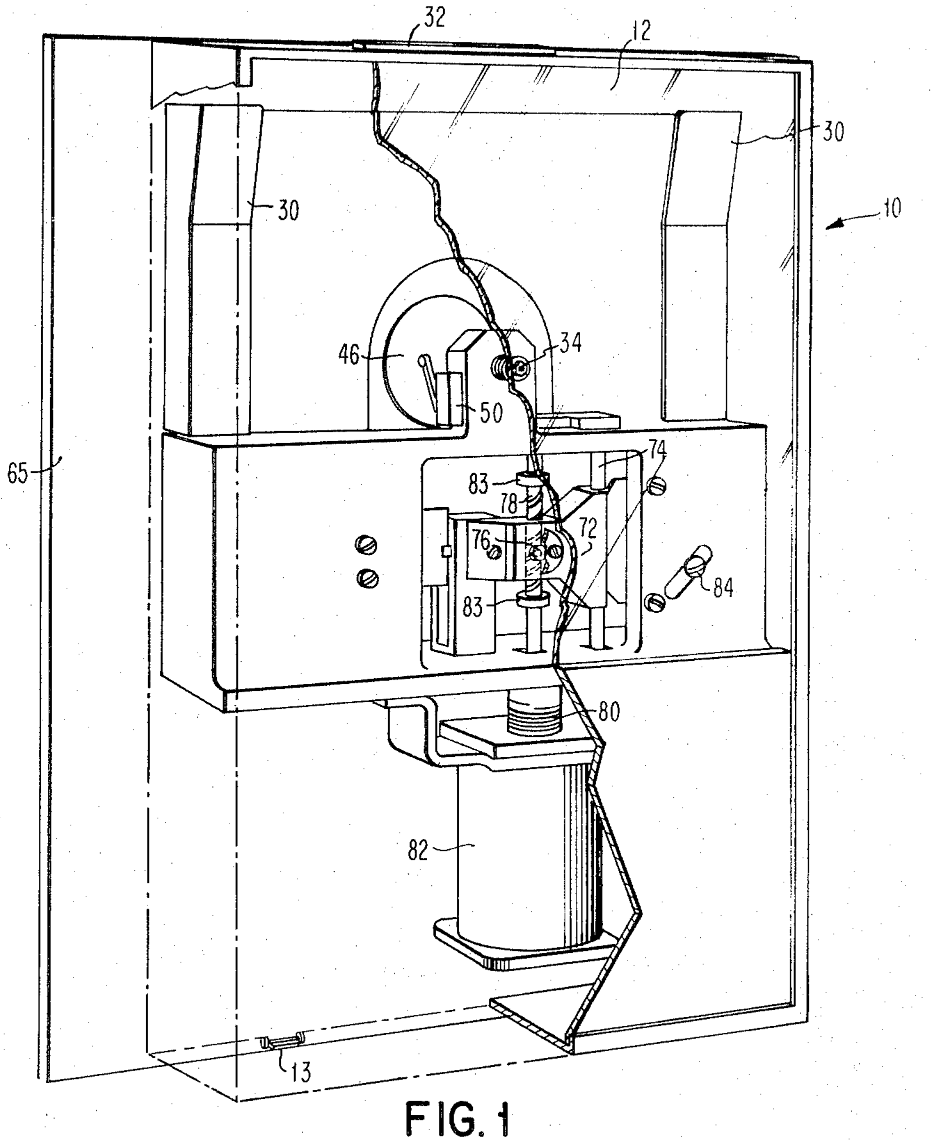
FIG. 1
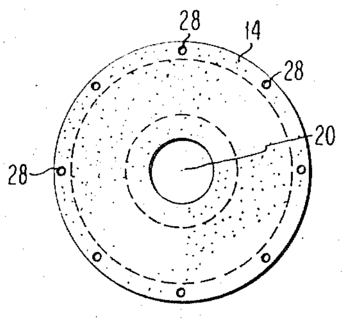
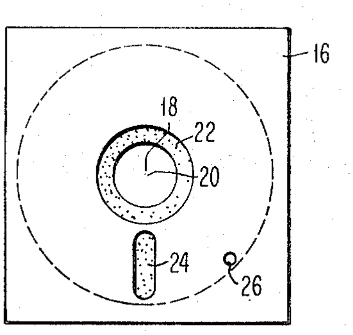
FIG. 2(a) FIG. 2(b)
*INVENTORS*
WARREN L. DALZIEL
JAY B. NILSON
DONALD L. WARTNER
*BY*
*Nathan N. Kallman*
ATTORNEY

DATA STORAGE APPARATUS EMPLOYING A SINGLE MAGNETIC DISK

CROSS-REFERENCE TO RELATED APPLICATIONS

Copending U.S. patent applications Ser. Nos. 20,017 filed Nov. 10, 1969; 887,017 filed Dec. 22, 1969; and 20,529 filed Dec. 17, 1969 disclose novel disk and cartridge assemblies such as are utilized in the apparatus of this invention.

BACKGROUND OF THE INVENTION

1. Field of the Invention

This invention relates to a novel magnetic disk data storage apparatus, and in particular to a miniature direct access single disk storage file employing an interchangeable sealed disk cartridge.

2. Description of the Prior Art

Presently known magnetic disk files may employ fixed disks, or removable, interchangeable disks, singly or as a multiplicity. The removable or interchangeable disks afford greater flexibility than the fixed type, in that recorded data may be stored off-line, and read out in a file when desired at a later time. Interchangeable disks may be used in different files of the same type, and thus may be transferred or mailed from one location to another. However, with the removable and interchangeable disks used today, it is generally necessary to provide a housing or covers to keep the disk assembly free from dust and contamination when off line. During operation, it is then necessary to remove the disk assembly from the housing or cover for use in a storage file.

SUMMARY OF THE INVENTION

An object of this invention is to provide a novel and improved miniature storage file utilizing a removable and interchangeable single disk.

Another object of this invention is to provide a compact storage file, wherein the disk may be easily inserted and replaced for recording and readout.

Another object is to provide a magnetic disk storage file, wherein a sealed flexible disk may be accessed while the disk remains within the sealing cover.

A further object is to provide a disk storage file wherein a disk in a sealed cartridge may be accessed radially.

In an embodiment of this invention, a magnetic disk file comprises an apertured housing having a hinged cover. Guide slots are provided for accommodating a rectangular sealed cartridge containing a flexible magnetic disk. With the file housing hinged cover open, the disk cartridge is dropped into the slots, and the cover is pushed to close the housing. As the cover closes, it actuates a device that centers the apertured disk to a drive mechanism, and trips a microswitch that serves to urge the disk into contact with a magnetic head, when the head loading signal is on. The head assembly is mounted to a carriage that is stepped by a motor drive in response to signals from a control unit. The carriage and the head move radially and bidirectionally relative to the disk, along an apertured portion of the cartridge, which exposes the magnetic disk surface to the transducing head. An additional aperture in the cartridge cooperates with uniformly spaced circumferential openings in the disk to achieve photosensing, so that disk sector positions may be determined as the disk rotates. By means of the novel apparatus, a compact sealed disk cartridge may be conveniently recorded, stored, mailed, and read out without problems of contamination, destruction, or loss of data or other deteriorating effects.

BRIEF DESCRIPTION OF THE DRAWING

The invention will be described in detail with reference to the drawing in which:

FIG. 1 is a perspective front view, partly broken away, of the miniature, single disk file of this invention;

FIG. 2*a* is a plan view of a magnetic disk, such as is utilized with the inventive file;

FIG. 2*b* is a plan view of a sealed cartridge employed to enclose the disk of FIG. 2a;

Similar numerals refer to similar elements throughout the drawing.

DESCRIPTION OF THE PREFERRED EMBODIMENT

Figure 3A:
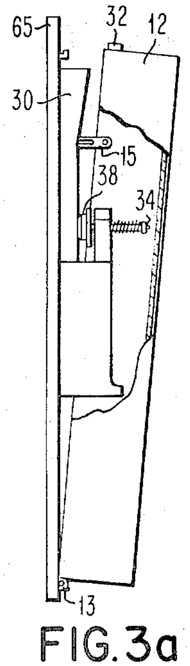
FIGS. 3*a* and 3*b* are side elevational views, illustrating the operation of the window and centering device employed with the disk cartridge of the disclosed apparatus.

With reference to FIG. 1, a housing 10 has a hinged window type cover 12 that may be opened to allow insertion of a flexible magnetic disk 14 contained in a sealed cartridge 16, such as shown in FIG. 2 and disclosed in the aforementioned copending patent applications. The cartridge 16 has in its opposing surfaces a central aperture 18 larger than a concentric central aperture 20 formed in the disk 14, so that an annular portion 22 of the disk is exposed. The cartridge 16 also has an elliptical opening 24 that serves to expose a radial portion of the disk, and enables accessing by a magnetic head of the circular tracks developed during rotation of the disk within the sealed square cartridge. A small hole 26 is also formed in juxtaposition in both surfaces of the cartridge 16, so that when the disk rotates within the cartridge, uniformly spaced circumferential holes 28 in the disk pass by the hole 26 and allow passage of light or radiant energy to generate a sector signal.

Figure 3B:
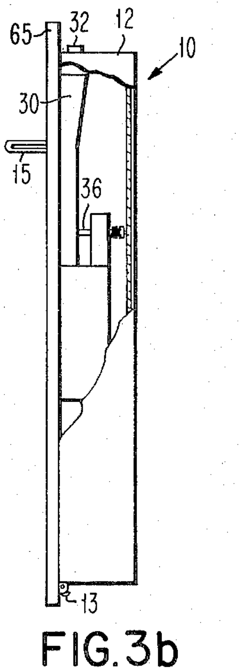

To operate the single disk file of this invention, the cover 12 is opened on its hinge 13, and retained in open position by a slide and stop device 15 (See FIGS. 3*a* and 3*b*). A sealed disk cartridge 16 containing a flexible magnetic disk 14 is then dropped into a pair of grooved guides or slots 30. A stop structure or pin at the bottom of the guides locates the disk cartridge vertically. The cover 12 is then moved about its hinge 13 and along the slide 15 to close the opening in the housing 10, and is latched in position by a snap retainer device 32. With the cover 12 closed, the cover window bears against a spring-loaded pin 34 located centrally at one end of a shaft 36 fixed in a portion of the housing 10, as illustrated in FIG. 36. At the other end of the shaft 36 is a conical portion 38 that serves to engage the central aperture 20 of the disk, and thereby constrains and finely positions the disk vertically and horizontally relative to the file housing. The disk 14 is centered relative to the cone 38 and the shaft 36, which are referenced to other critical parts of the machine, such as a magnetic head assembly and an optical photosensing device.

Figure 4:
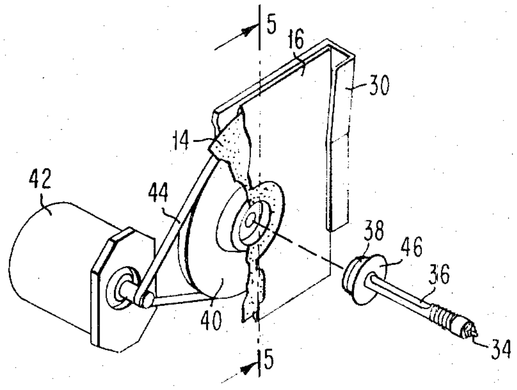
FIG. 4 is a perspective view, broken away, depicting the elements involved in the drive system of the novel apparatus.
Figure 5:
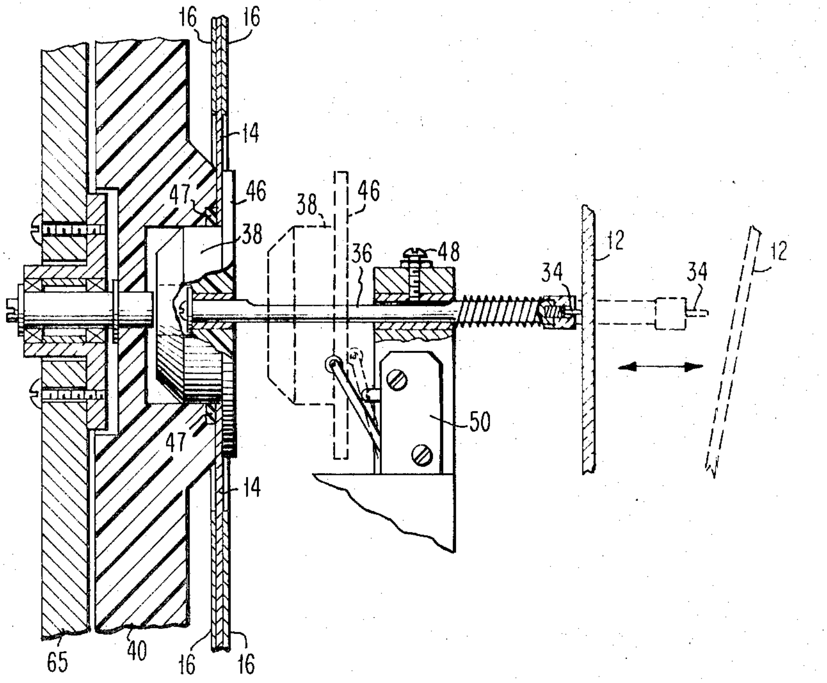
FIG. 5 is a sectional side view of the disk file portraying the action of the centering cone device with respect to the drive system.

The closing of the cover 12 also serves to clamp the flexible magnetic disk 14 to the drive mechanism of the machine. As the window is closed, the shaft 36 and the centering cone 38 are urged towards a drive hub 40, which is coupled to a drive motor 42 through a flat pulley belt 44, shown in FIG. 4. A flange or shoulder 46 formed with the cone 38 engages the exposed disk portion 22 on one side, while a quadring 47, (which is an O-ring type elastomeric seal, having a rectangular cross-section) seated in a recess of the drive hub 40, is frictionally engaged with the other side of the exposed disk portion 22. The cone 38 and flange 46 are freely rotatable, by means of a bearing, although the shaft 36 to which they are mounted is not rotatable. A screw 48 is positioned close to a flat recess in the shaft 36 to prevent rotation. In this manner, the disk 14 may be rotatably driven within the sealed cartridge 16, which is restrained from rotating with the disk by virtue of the guides 30 that hold the square-cornered cartridge.

Figure 6:
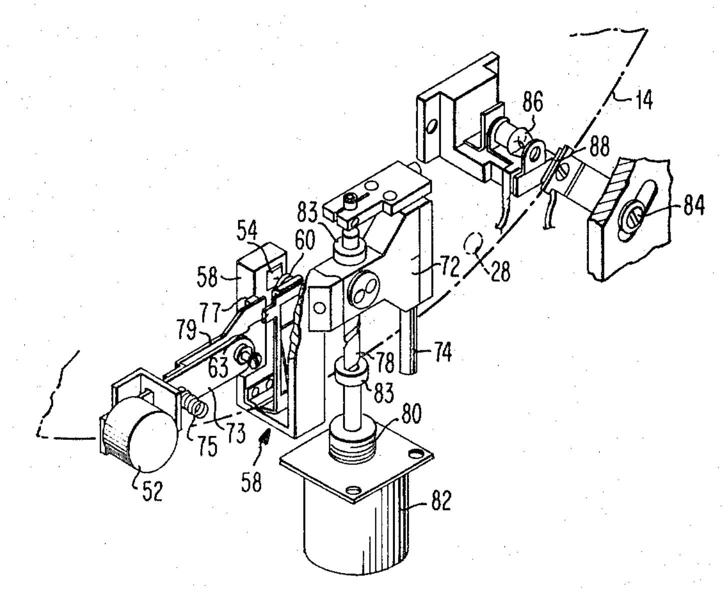
FIG. 6 is a perspective view of the apparatus found within the housing.

The closing of the window cover 12 also trips a microswitch 50 that energizes a solenoid 52 (see FIG. 6) used for loading the disk to the head assembly. The disk will be urged to the head assembly with the solenoid 52 energized, when a signal from an external control unit instructs or commands a load head mode.

Figure 7:
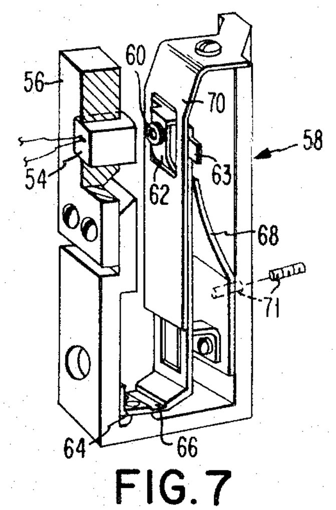
FIG. 7 is a perspective view of an arm assembly that is instrumental in loading the record disk to a magnetic head.

To achieve magnetic transducing between the magnetic head 54 and the disk 14 when the head loading mode is on, the disk is moved towards the head arm assembly by action of the solenoid 52 (see FIG. 8*a*) so that the transducer head 54 is in close contact with the disk portion that is exposed by the elliptical cartridge opening 24. For this purpose, a head assembly 54 is fastened to a head mount 56, that is joined to a U-shaped arm 58 (see FIG. 7) wherein the disk 14 is located.

To ensure close contact between the transducing head 54 and the record medium or disk 14, a pressure pad 60 is mounted to a support 62, which is connected to a fixed bracket 64 through a flexure pivot 66. The flexure pivot 66 allows the pressure pad 60 to be loaded against the record medium or disk 14 by a load spring 68; or be retracted behind a guide element 70. The guide element 70 also serves as a registration surface for mounting the arm assembly 58. The flexure pivot 66 and the angle formed between the pressure pad support 62 and bracket 64 permits the pressure pad to move freely in one path, and to resist motion in all others, thereby providing proper alignment for head-to-disk contact. An adjustment screw 71 enables adjustment of the force which the pressure pad 60 exerts against the disk 14 and magnetic head 54, by deflection of the load spring 68. The pressure pad has an opening which allows the head 54 to depress the flexible disk 14 for close surface contact between the head and disk.

Figure 8A:
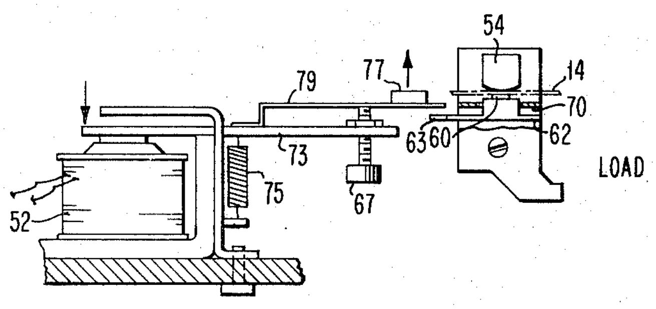
FIGS. 8*a* and 8*b* are plan views illustrating the action of disk-to-head loading and unloading.
Figure 8B:
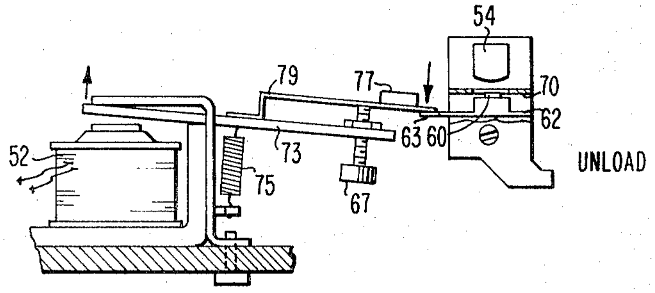

In operation, when the solenoid is energized, it causes a lever arm 73 to pivot and overcome the force of a spring 75 that tends to keep the mechanism of the head arm assembly in an unloaded condition (see FIGS. 8*a* and 8*b*). The movement of the lever arm 73 urges the load spring 68 to bear against the pressure pad support 62, that moves about the flexure pivot 66, towards the disk and opposing head assembly 54.

When so loaded, a sponge rubber pad 77, situated on a support 79 tied to the lever arm 73, is moved against the disk cartridge at an area that precedes the transducing area of the head assembly 54 relative to disk rotation. The cartridge has a cleaning material on its inner surface that wipes the disk 14 during rotation, and the rubber pad 77 presses the cartridge cover and the disk against a platen with sufficient force to provide adequate wiping, but yet not enough to prevent disk rotation effectuated by the drive motor 42. This pressure may be adjusted by means of a screw 67 associated with a platen, the platen (not shown) being mounted to a baseplate 65 of the housing.

To disengage the disk from the head, the window cover 12 is opened, thereby deenergizing the solenoid 52, allowing the spring 75 to retract the arm 73, lift a tab 63, and thus withdraw the load spring 68 and pressure pad support 62, thereby releasing the head loading mechanism.

To achieve track accessing, the head arm 58 is attached to a carriage 72 in a predetermined position and alignment, determined by three registration surfaces. The carriage 72 is movable along a fixed guide rod 74, and a rigid stylus 76 attached to the carriage is spring-loaded into the thread or groove of a lead screw 78 that is fixed in a parallel relation to the rod 74 (See FIG. 9). Attached to the lead screw. 78 through a spring coupling 80 is a bidirectional stepping motor 82 that steps the carriage radially relative to the disk 14. Rotation of the lead screw 78 by the motor 82 urges the carriage 72 to move incrementally in a forward or reverse direction. For example, the pitch of the lead screw 78 may be such that for each step of the motor 82, the head is moved radially by one track. Limit clamps 83 attached to the lead screw prevent overdriving, and allow the carriage to be set for accessing between track zero and a given track *n*. In this way, the magnetic head 54 can move bidirectionally from track to track along the exposed portion 24 of the disk in response to signals to the stepping motor 82 from a central processor or control unit.

In order to determine track sector position, a sector pulse sensing assembly 84 is provided. A light source 86 transmits radiation through apertures 26 of the cartridge, and whenever a disk hole 28 passes the apertures 26, the radiation impinges on a photosensor 88 to generate a sector pulse. These pulses are then used to count the number of sectors that have passed a reference point, counted from a start or home index position, in a manner known in the art.

The invention is not necessarily limited to the particular configuration described above, but may include modifications in structure and materials, inter alia..

What is claimed is:

1. A magnetic disk file for processing signals by transducing operation between a magnetic head assembly and a flexible magnetic disk which is enclosed in an interchangeable cartridge, with the cartridge having a central aperture larger than a concentric central aperture in said disk, so that an annular portion of said disk surrounding said central aperture of said disk is exposed, said cartridge further having an elliptical aperture disposed radially relative to said disk, comprising:

a housing for enclosing said disk file, including a movable cover attached thereto;

guide means joined to said housing into which said cartridge is inserted for maintaining said cartridge stationary during rotation of said disk;

a non-rotary shaft having a rotatable centering cone at one end and a rotatable flange adjacent to said cone, said cone and flange being coaxially mounted to said shaft, said shaft movable along its longitudinal axis in response to the movement of said cover, said centering cone serving to penetrate the central aperture of said disk for centering said disk relative to said shaft, and said flange acting to engage the exposed portion of one surface of said disk, when said cover is moved to close the housing;

a rotary drive hub assembly for clamping the exposed portion of the other surface of said disk and for engaging said rotatable centering cone with the disk therebetween;

drive means connected to said hub assembly for rotating said hub assembly, centering cone and flange, so that said disk is rotated therewith;

means for loading said flexible disk into intimate contact with said head assembly, so that said head assembly is aligned with said elliptical aperture; including a U-type spaced arm within which said disk is located, said arm serving to mount said head assembly and said disk in juxtaposition to said head assembly;

a pressure pad mounted within said arm for urging said disk into contact with said head assembly; and flexure means for actuating said pressure pad toward said disk and head assembly in a loading mode, and for retracting said pressure pad from said disk in an unloading mode.

2. A magnetic disk file as in claim 1, wherein said loading means includes a switch means actuated by the closing of said cover, whereby a solenoid is energized to enable disk-to-head loading.

3. A magnetic disk file as in claim 1, including a head carriage assembly for accessing said rotary disk radially for track-to-track operation.

4. A magnetic disk file as in claim 1, including a stepping motor for driving said carriage assembly intermittently and bidirectionally.

5. A magnetic disk file as in claim 1, including means for sensing the sector position of said rotary disk.

6. A magnetic disk file as in claim 5, wherein said sensing means comprises a photosensing assembly including a radiation source and a photoelectric signal generating means responsive to said source.

* * * * *